(43.)

SAMUEL T. MILLER.

Combined Corn Stalk Cutters and Cultivators.

No. 122,479.           Patented Jan. 2, 1872.

Witnesses:
Wes/ Wagner.
Parker H. Sweet Jr.

Inventor:
Samuel T. Miller,
by Johnson, Klaucke &Co.
his attorneys

AM. PHOTO-LITHOGRAPHIC CO. N.Y. (OSBORNE'S PROCESS.)

122,479

UNITED STATES PATENT OFFICE.

SAMUEL T. MILLER, OF EMPIRE PRAIRIE, MISSOURI.

IMPROVEMENT IN COMBINED CORN-STALK CUTTERS AND CULTIVATORS.

Specification forming part of Letters Patent No. 122,479, dated January 2, 1872.

I, SAMUEL T. MILLER, of Empire Prairie, in the county of Andrew and State of Missouri, have invented a new and useful Improvement in Combined Corn-Stalk Cutters and Cultivators, of which the following is a specification:

The nature of my invention consists in a main frame so constructed that either an independent cutting roller-frame may be attached to it for the purpose of cutting corn-stalks, or plow-shovel frames for use as a cultivator, as hereinafter more fully described.

Figure 1:
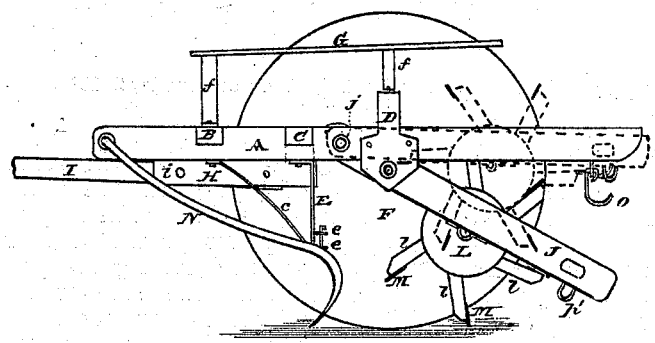
Figure 2:
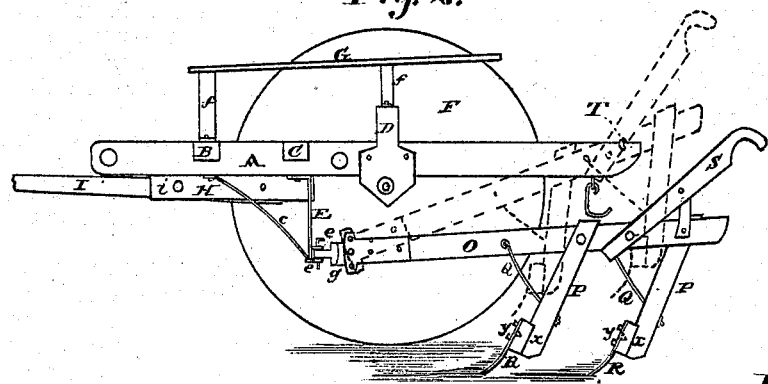
Figures 3, 4:
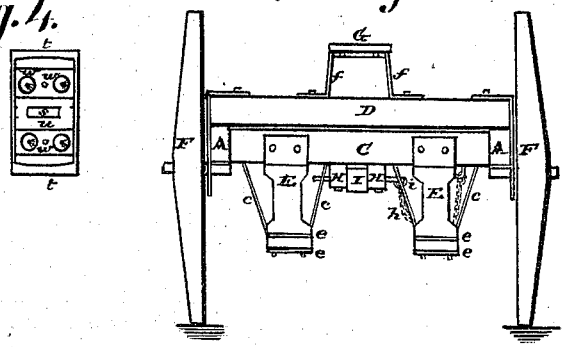
Figure 5:
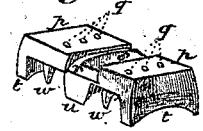

In the accompanying drawing, Figure 1 is a side elevation of my improved machine when used as a corn-stalk cutter. Fig. 2 is a similar view of the machine when used as a cultivator. Fig. 3 is a rear view of the main frame without any of the attachments, and Figs. 4 and 5 are detached views of the means of attaching the cultivator-shovels to their standards.

The object of my invention is the production of an agricultural implement, which in an inexpensive and yet perfectly effective manner combines in one machine the requirements of a cultivator as well as a corn-stalk cutter, by certain attachments to a main frame, which latter forms the basis for either machine. This main frame consists of two longitudinal pieces, A A, connected by cross-pieces B C D, to the middle one C of which are secured plates or standards E for the attachment of the cultivator-frames. The piece D extends across the frame at its center, where the axles of wheels F are attached, and on suitable plain or spring braces $f$ secured on it and the cross-piece B, rests the seat G for the driver. To the under side of the cross-pieces B C, and extending a short distance forward of the piece B, are two bars, H, between which the tongue I is pivoted near the cross-piece C, and held in a horizontal position by means of a pin, $i$, which may be attached to a chain, $h$. The standards E are at their lower ends provided with double flanges $e\ e$, between which the clevises $g$ of the plow-frames are pivoted when the machine is used as a cultivator. Rods $c$, extending from the under side of cross-pieces B to the lower ends of standards E, form braces to prevent any lateral movement of the standards. This frame comprises the main frame always used with either corn-stalk cutter or cultivator.

When the implement is to be used as a corn-stalk cutter I use an independent square frame, J, fitting loosely between the sides A of the main frame, to which it is held by means of a rod, $j$, passing through the main frame and frame J, the rod $j$ forming the pivot for the frame J. In this frame is mounted a roller, L, provided with arms $l$, carrying cutting-blades M, which are parallel with the roller. To the forward ends of the pieces A of the main frame are attached rake-teeth N, so as to rise and fall freely. These rake-teeth are curved at their lower free ends, and may be forked if desired. They serve to rake the stalks parallel to the line of motion of the machine, so that the cutting-blades M can strike them at right angles. In Fig. 1 the corn-stalk cutter is represented as arranged for operation, the rake-teeth N and roller L, with its cutting-blades M, being shown.

When the work is done and the machine is to be brought home, the teeth N are removed from their bearings and placed on the main frame. The pin $i$ being removed, the main frame is tilted back from the tongue I until the hooks $o$, attached to the under side of the rear ends of pieces A, can be hooked into eye-bolts $p'$, secured to the rear of frame J. The main frame is then tilted back and secured to the tongue I by pin $i$, whereby the roller-frame is elevated from the ground. It will be understood that the driver, by bringing his weight on the seat G, nearer to or further from the center cross-piece D, can counterbalance the weight of the roller-frame so as to take its weight away from the tongue.

In order to change the machine to a cultivator the rear end of the roller-frame is unhooked from the rear end of the main frame, when, by taking out the rod $j$, the roller L can be entirely removed from the main frame. After the rake-teeth N have been removed also, the main frame is ready for the cultivator attachments. These consist of two cultivator-frames O, from opposite sides of which extend downward, and one in rear of the other, two inclined standards, P, suitably braced from the beam by rods Q, which standards carry the shovel-plows R. The beams at their forward ends carry clevises $g$, so pivoted to the beam that, with their pivots to the flanges $e\ e$ of the standards E of the main frame, they form a kind of universal joint. From the beams O extend handles S, by which the cultivator-plows are guided, and which are provided with projecting hooks T, which, when the cultivators are to be held from the ground in going to or from the field, are hooked into the hooks o or on the main frame. The plow-shovels R are secured to their standards by peculiar means, by which any lateral motion of the same on the standard is rendered impossible.

In Figs. 4 and 5 I have shown the blocks, which are provided with a plain even surface, p, to which the shovel-plows are attached by bolts q. In the middle of this surface is formed a recess, r, and an elongated cross-slot, s. The reverse surfaces of these blocks are provided with concave end pieces t, and a corresponding concave center piece, u, through which the slot s passes, while points w project between the pieces t and u. The concavity of these pieces corresponds with the convex surfaces x of the lower ends of the standards P, and the points w enter into the standards when the blocks are secured to them by means of a bolt, y, passing through the standard and slot s, and held by a nut on the rear of the standard. The slots s being elongated, the shovel-plows can be set to any desired angle, while the head of the bolt has room to freely move between the block and the shoulder in the recess r.

By the above construction the same main frame answers for the cultivator and the corn-stalk cutter attachments, and thus enables a farmer to have the two implements in one machine, which, with its simplicity, combines the advantage of cheapness of construction.

Having described my invention, I claim—

The frame A B C with the hangers E, adapted for use with the corn-stalk cutter, roller-frame J, or the double cultivator-frames O, the pivot fastening of each being one above the other, respectively, in said frame A and hangers E, whereby the same frame may be used to receive and hold either implement for work without change, as shown and described.

SAML. T. MILLER.

Witnesses:
DAVID BONHAM,
JAMES HOWITT. (43)